Dec. 16, 1930. E. P. BEWLEY 1,785,243

BRAKE TESTING MACHINE

Filed Jan. 9, 1928

INVENTOR
E. P. Bewley
BY
ATTORNEY

Patented Dec. 16, 1930

1,785,243

UNITED STATES PATENT OFFICE

EDSON P. BEWLEY, OF SANTA CRUZ, CALIFORNIA

BRAKE-TESTING MACHINE

Application filed January 9, 1928. Serial No. 245,412.

This invention relates to apparatus for testing the brakes of motor vehicles, my principal object being to provide a machine for the purpose which will accurately indicate the efficiency of the brakes under various pedal pressures up to the slipping point of the wheels and brakes; and will also indicate the relative holding power or equalization between opposed brakes. Also any out-of-round brake drums or dragging brakes will show up very plainly, as the machine is so constructed that its action is very sensitive when any slight friction is applied to the rollers supporting the wheels of the car. My improved machine will therefore indicate imperfections in the brake rigging that other testing machines will not catch, and without the great pressure usually necessary before such other machines function. The apparatus is also so arranged as to enable comparisons between any and all of the above conditions of the opposed brakes to be readily made.

The device is also so arranged that it requires a greater holding power on the part of the brakes to cause the wheels to slip than is the case when on the road. A factor of safety in operation is therefore provided, since if the brakes are found to be adequate to cause the wheels to slip when testing operations are being made, such brakes will be more than adequate when the vehicle is in actual service on the road.

A further object of the invention is to construct the machine in such a manner that springs, hydraulic, electric and other possibly varying features are avoided and the action is always positive, and a full mechanical reading or comparison of one wheel relative to the other is obtained on the dials.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
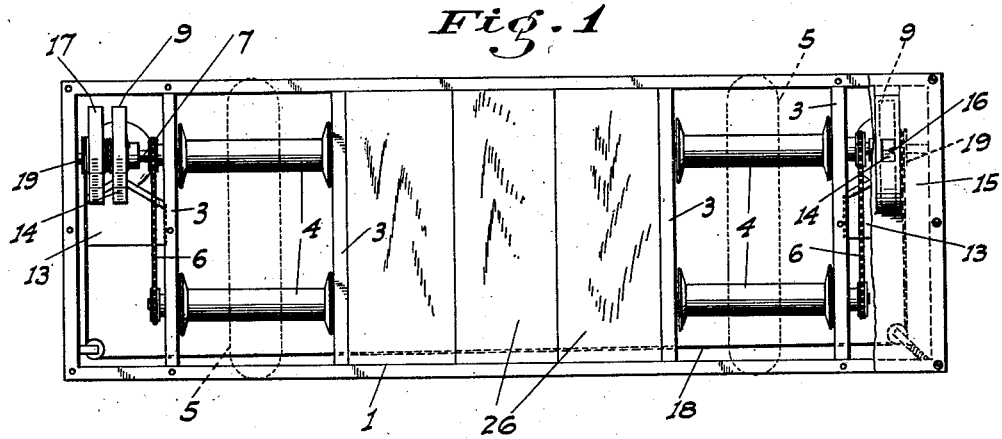
Fig. 1 is a top plan view of my testing machine.
Figure 2:
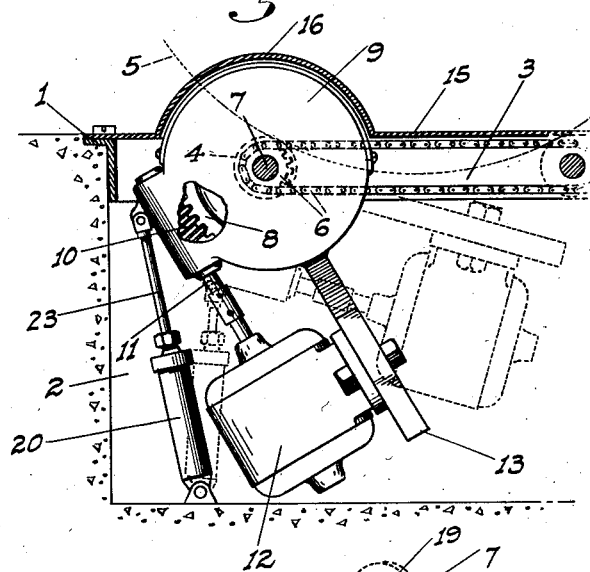
Fig. 2 is an enlarged end view of one of the testing units, partly broken out.
Figure 3:
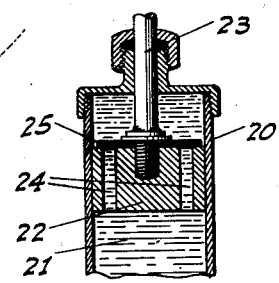
Fig. 3 is a fragmentary section of a dashpot device.
Figure 4:
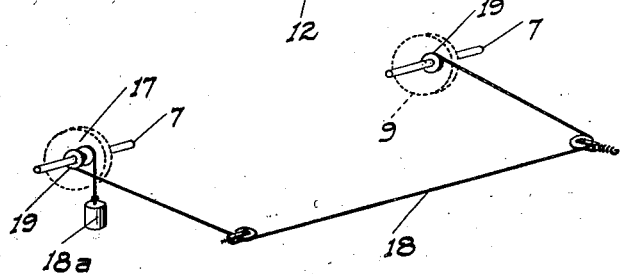
Fig. 4 is a diagram of a recording or dial disk operating mechanism.

Referring now more particularly to the characters of reference on the drawings, the numeral 1 denotes a rectangular frame, set level with the floor or ground and surrounding a pit 2 depending under the frame. Spaced pairs of spaced beams 3 extend across the pit, these beams being secured to the frame 1. The frame and beams are preferably made of structural iron of suitable strength to support the weight of a motor vehicle and are rigidly connected together in any suitable manner to form a rigid and unyielding unit.

Disposed between and supported by the beams of each pair are rollers 4, spaced apart relative to the longitudinal plane of a vehicle a sufficient distance to form supports for the wheels 5 of the vehicle at circumferentially spaced points thereon. Each pair of rollers is connected in driving relation with each other and so as to turn in the same direction by suitable means such as a sprocket and chain drive 6. The axis of these rollers is of course disposed so as to be parallel to the axle of the wheel supported thereby. Also the distance between the center of length of the transversely spaced pair of rollers is equal to the standard tread or gage between the wheels of the vehicle.

One roller of each pair is driven by means of a specially arranged mechanism constructed as follows: The axial shaft 7 of such roller projects across the space between one side of the frame 1 and the adjacent beam 3 and has a worm gear 8 fixed thereon. The casing 9 for this gear is turnably supported on the shaft, and has a worm 10 mounted therein which engages the gear. The shaft 11 of the worm depends from the casing and is operatively connected to an electric motor 12. This motor is rigidly secured to a heavy bar 13 which depends from and is secured to the casing 9. It will therefore be seen that the casing and the bar 13 form a pendulum, and that the motor itself also in effect forms a part of this pendulum adding to the weight thereof, so that this operating structure normally tends to hang downwardly with its greatest weight in a vertical plane.

When a wheel is supported by a pair of rollers and is free to turn (or when the brake is not applied) the driving of the roller by means of the gear and worm connection will not affect the position of the pendulum structure, since the weight thereof is greater than the resistance to turning of the wheel. When the brake is applied on the wheel, the latter offers a resistance to turning which is of course imparted to the rollers engaged thereby. The drive worm being mounted on the gear casing, which can turn independently of the roller, causes said worm to work around the periphery of the gear as well as turning the same on its axis. As a result the pendulum structure moves upwardly from its normal lowermost position. The greater the resistance offered by the braked wheel, the greater will be the extent of upward movement of the pendulum, as will be evident. I have found from actual experience that without moving through an arc of 90°, the movement of the pendulum is sufficient to take care of all possible brake efficiencies up to the point of slipping of the wheel on the rollers. This is because as the pendulum rises on its arc, the weight thereof projects more and more to one side of the center of oscillation (which is the shaft 7), correspondingly increasing the moment of the pendulum which tends to restore it to its normal position. Since the pendulum naturally swings very easily from such normal position, the machine is very sensitive to a slight friction applied to the rollers.

The tire of the wheel engages a pair of rollers, both of which are connected in driving relation to each other and are so spaced apart as to cause the wheel to wedge between the rollers whereas when actually on the road the wheel has only one point of contact with the road. It will therefore be evident that if the brake will hold sufficiently to cause the rollers to slip on the tire, such brake will be more than adequate to hold the wheel on to the slipping point when on the road.

If the wheel has a dragging brake, by which is meant one which frictionally engages its drum without any pressure being applied to the pedal, this will be immediately evidenced by the upward swinging of the pendulum structure at a time when such structure should actually remain stationary. This is because, as above stated, the pendulum is very sensitive when hanging in a downward position. If the brake drum is out-of-round, so that the brake intermittently holds and lets go, this condition will be immediately evidenced by an oscillating instead of a steady movement of the pendulum.

It will also be noted that both the rear and front wheel brakes are being tested at the same time, and both sets of rollers are driven by mechanisms which are duplicates of each other but are independent in their operation. If, therefore, the brakes have the same efficiency or are properly equalized, both pendulums will swing through the same arc. If unequal conditions obtain, however, such as dragging or grabbing brakes, out-of-round drums etc., such conditions will be evidenced by the uneven movement of the pendulums relative to each other. In order to enable the movement of the pendulums to be seen from above the floor, the upper peripherial surfaces of the gear casings are arranged as dial plates, marked with arbitrarily spaced transverse graduations 14. Cover plates 15 are mounted on the frame 1 and cover the operating mechanisms in the pit, these covers being slotted on top to expose a portion of the dial plates and having fingers 16 to read against the graduations. The graduations on both plates being the same, the readings may be easily compared when the device is in operation to see whether the opposed brakes have the same holding power or are properly equalized. In order to enable the readings of both pendulums to be viewed in close side by side relation, so as to permit of easier comparison, a graduated dial disk 17, the same size as the gear casing, is mounted alongside one of the gear casings, preferably concentric therewith but independent thereof. This disk is rotated in synchronized relation with the movement of the gear casing on the opposite side by suitable means such as a cable 18 extending therebetween and wrapped about and secured to pulleys 19 mounted in connection with said disk and casing. The cable is of course arranged so that the disk and casing both turn in the same direction and to the same arcuate extent. A weight arranged as at 18a may be applied to the disk to return the same to its normal position when the corresponding gear casing likewise returns.

To prevent too fast a retractive movement of the pendulum without restricting the upward swinging movement thereof, I mount a retarder or dashpot arrangement in connection with each pendulum. This device comprises a cylinder 20 pivoted on to the bottom of the machine and filled with oil 21 or similar suitable fluid. A piston 22 is slidable in the cylinder with a free fit, the piston rod 23 projecting from the top of the cylinder and being pivoted on to the casing 9. This structure is disposed so that when the pendulum is in its lowermost normal position, the piston is adjacent the top of the cylinder, and when the pendulum swings said piston moves down in the cylinder. This piston has relatively large passages 24 therethrough which are covered by a flexible flap 25. This arrangement permits of unrestrained downward movement of the piston and a corresponding upward swing of the pendulum, but retards the opposite movement of the piston, since the flap then forms a positive closure for the passages and the liquid can then only slowly pass from one side of the piston to the other between the piston and cylinder wall.

The pit between the roller and operating units is covered by removable plates 26 whose removal enables a mechanic to get down in the pit and make any adjustments which may be necessary to the brakes of the car while tests are being carried out and the wheels are still in place on the testing machine.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A vehicle brake testing machine including a roller to be engaged by a wheel of the vehicle, a pendulum mounted independent of one roller, driving means for the roller mounted on the pendulum, and connections between the driving means and the roller for causing the force of the driving pressure to impart a rotation to the pendulum only when a resistance to the free rotation of the roller is had.

2. A vehicle brake testing machine including a roller to be engaged by a wheel of the vehicle, a pendulum mounted axially with but independent of one roller and depending therefrom, a worm gear fixed axially with the roller, a worm engaging the worm gear, and operating means for the worm fixed on the pendulum.

3. A structure as in claim 2 in which said operating means is in the form of an electric motor positioned to serve as a part of the pendulum.

4. A structure as in claim 1, with a dashpot structure associated with the pendulum and arranged to retard its downward movement without interfering with its freedom of upward movement.

In testimony whereof I affix my signature.

EDSON P. BEWLEY.